United States Patent
Agrawal et al.

(10) Patent No.: US 6,996,553 B2
(45) Date of Patent: Feb. 7, 2006

(54) FAST POLICY CLASSIFICATION FOR STRINGS

(75) Inventors: Dakshi Agrawal, Monsey, NY (US); Douglas Morgan Freimuth, New York, NY (US); Sivaram Gottimukkala, Durham, NC (US); Lap Thiet Huynh, Apex, NC (US); Dinakaran B. Joseph, Durham, NC (US); John J. Majikes, Apex, NC (US); David Paul Olshefski, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/109,185

(22) Filed: Mar. 28, 2002

(65) Prior Publication Data

US 2003/0187817 A1 Oct. 2, 2003

(51) Int. Cl.
*G06F 17/30* (2006.01)

(52) U.S. Cl. .............................. 707/2; 707/3; 707/100
(58) Field of Classification Search ................ 707/1–7, 707/100; 711/216; 705/50
See application file for complete search history.

(56) References Cited

U.S. PATENT DOCUMENTS

| | | | | |
|---|---|---|---|---|
| 5,754,844 A | * | 5/1998 | Fuller .............................. | 707/6 |
| 6,556,984 B1 | * | 4/2003 | Zien ............................... | 707/3 |
| 6,718,325 B1 | * | 4/2004 | Chandra ......................... | 707/6 |
| 6,772,140 B1 | * | 8/2004 | Dyer et al. ...................... | 707/3 |
| 2002/0059184 A1 | * | 5/2002 | Ilan et al. ...................... | 707/1 |

OTHER PUBLICATIONS

U.S. Appl. No. 09/320,903, filed May 27, 1999, Battacharya, et al.
U.S. Appl. No. 09/645,651, filed Aug. 24, 2000, Callis, et al.
*IBM Websphere Edge Services Aritecture, Guide to Edge Applications*, International Business Machines Corporation, (May, 2001).

* cited by examiner

*Primary Examiner*—Sam Rimell
(74) *Attorney, Agent, or Firm*—Jerry W. Herndon, Esq.; Steven M. Greenberg, Esq.; Christopher & Weisberg, P.A.

(57) ABSTRACT

A fast policy classification method and system. A policy differentiator can be provided which can include a policy repository configured to store hierarchical policy classification trees. The policy differentiator further can include a hashing module configured to produce integer values for string based selector attributes. In one aspect of the invention, the hashing module can include a longest string hashing function. A policy matching engine can be provided which is configured to locate policy rules in the hierarchical policy classification trees according to the integer values produced for the string based selector attributes. Finally, a policy matching engine interface can be provided through which policy queries and resulting policy decisions of the policy matching engine can be communicated between the policy matching engine and the policy enforcement entity.

6 Claims, 2 Drawing Sheets

FAST POLICY CLASSIFICATION FOR STRINGS

BACKGROUND OF THE INVENTION

1. Statement of the Technical Field

The present invention relates to a policy based classification of network requests and more particularly to the minimization of string operations when performing a policy based classification.

2. Description of the Related Art

The vast majority of computing devices process computer processing requests indiscriminately. That is, regardless of the requester, each request can be processed with equal priority. Given the exponential increase in network traffic across the Internet, however, more recent network-oriented computing devices have begun to provide varying levels of computing services based upon what has been referred to as a "policy based service differentiation model". In this model, the computing devices can offer many levels of service where different requests originating from different requestors receive different levels of treatment depending upon administratively defined policies.

The policy based service differentiation model is the logical result of several factors. Firstly, the number and variety of computing applications which generate requests across networks both private and public has increased dramatically in the last decade. Each of these applications, however, has different service requirements. Secondly, technologies and protocols that enable the provision of different services having different levels of security and quality of service (QoS) have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

A central requirement in enabling policy based service differentiation in the network context is that network requests must be classified into categories based upon applicable policy rules. Policy rules are well-known in the art inasmuch as policy rules specify service differentiation policies. Typically, policy rules take the form:

if (policy condition) then (policy action)

In the context of an Internet protocol (IP) based network, the policy condition can be specified according to packet attributes including header fields which identify not only the source and the destination of a network request, but also the value of the protocol field, the type of service requested, etc. Additionally, conventional policy conditions can include other criteria, for instance the identification of the requestor and the location and identity of the requested resource, commonly referred to as a Uniform Resource Indicator (URI). Generally speaking, these attributes and criteria can be referred to as "selector attributes". In that regard, it has become common for policy conditions to be specified in terms of ranges of selector attribute values, e.g. a range of IP addresses or ports, or a range of times.

Policy actions, by comparison, specify an operation or operations which are to be performed if and only if the policy condition associated with the policy action in the policy rule evaluates to true. The classification process to determine the applicability of a set of policy rules can be in of itself a time and resource consuming process. Specifically, in conventional policy based classifications, a computing module can sequentially scan a list of policy rules to determine whether a given policy rule ought to apply to a particular request. The process can continue until a first match can be found, or until the list of policy rules has been completely exhausted. Also, when evaluating the policy condition based upon string-based selector attributes such as a URI, user identification, or user group, string comparison operations are performed liberally during the matching process.

As is well-known in the art, however, string operations can be resource intensive when compared to integer operations. Furthermore, sequential searches are order n/2 searches and are considered highly inefficient, especially when searching a large list of data. Given the increasing importance of policy based service differentiation, however, it is important not only to scan the list of policy rules in the most efficient manner possible, but also, where string operations are required to perform policy rule matching, the number of string operations performed ought to be minimized.

SUMMARY OF THE INVENTION

The present invention overcomes the limitations of conventional policy based classification models and provides a novel and non-obvious policy based differentiation model which can process policy queries formed of string based selector attributes without undertaking excessive string comparison-operations. In one aspect of the present invention, a policy based differentiator can be provided. The policy based differentiator can be configured to be disposed in a policy enforcement entity having at least one policy oriented specific service. In particular, the policy enforcement entity can include a network entity selected from the group consisting of an edge server, an application server, a Web server, and a packet router.

The policy differentiator can include a policy repository configured to store hierarchical policy classification trees. The policy differentiator further can include a hashing module configured to produce integer values for string based selector attributes. In one aspect of the invention, the hashing module can include a longest string hashing function. A policy matching engine can be provided which is configured to locate policy rules in the hierarchical policy classification trees according to the integer values produced for the string based selector attributes. Finally, a policy matching engine interface can be provided through which policy queries and resulting policy decisions of the policy matching engine can be communicated between the policy matching engine and the policy enforcement entity.

Notably, the policy based differentiator further can include an integer range assignment module configured to assign integer ranges to corresponding ones of a set of selector attributes. The set of selector attributes can specify a range of policy conditions used to identify policy rules. A policy classification tree creation module also can be included which can be configured to create policy classification trees based upon the set of selector attributes and corresponding assigned integer ranges. Finally, a policy manager can be provided through which the policy classification trees can be modified.

A policy based differentiation method also can be included in accordance with the inventive arrangements. Specifically, the policy based differentiation method can include the steps of extracting a string based selector attribute from a network request; assigning an integer value to a string based selector attribute; traversing a hierarchical policy based classification tree based upon the integer value; and, locating in the policy based classification tree a matching policy rule. The method further can include the step of applying the matching policy rule in a specific service in a policy enforcement entity.

Notably, the step of assigning an integer value to a string based selector attribute can include the step of performing a longest string hashing function to the string based selector attribute. Additionally, the method can include the steps of assigning integer ranges to each of a set of selector attributes forming corresponding policy conditions for identifying policy rules based upon provided selector attributes. Subsequently, the set of selector attributes and assigned integer ranges can be arranged in the hierarchical policy classification tree.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a fast policy classification system. The fast policy classification can establish integer based ranges for string based hierarchical selector attributes such as URIs, domain names and the like. Once established, the integer based ranges can be ordered into a policy classification tree. Subsequently, integers can be assigned to the string-based selector attributes of received requests. For example, a longest string hashing mechanism can be applied to the selector attributes of received requests to produce the integers. Finally, the policy classification tree can be traversed for each received request in order to locate a matching rule. Importantly, the policy classification tree can be traversed by performing integer comparisons, rather than string comparisons previously required by conventional policy classification techniques.

Figure 1:
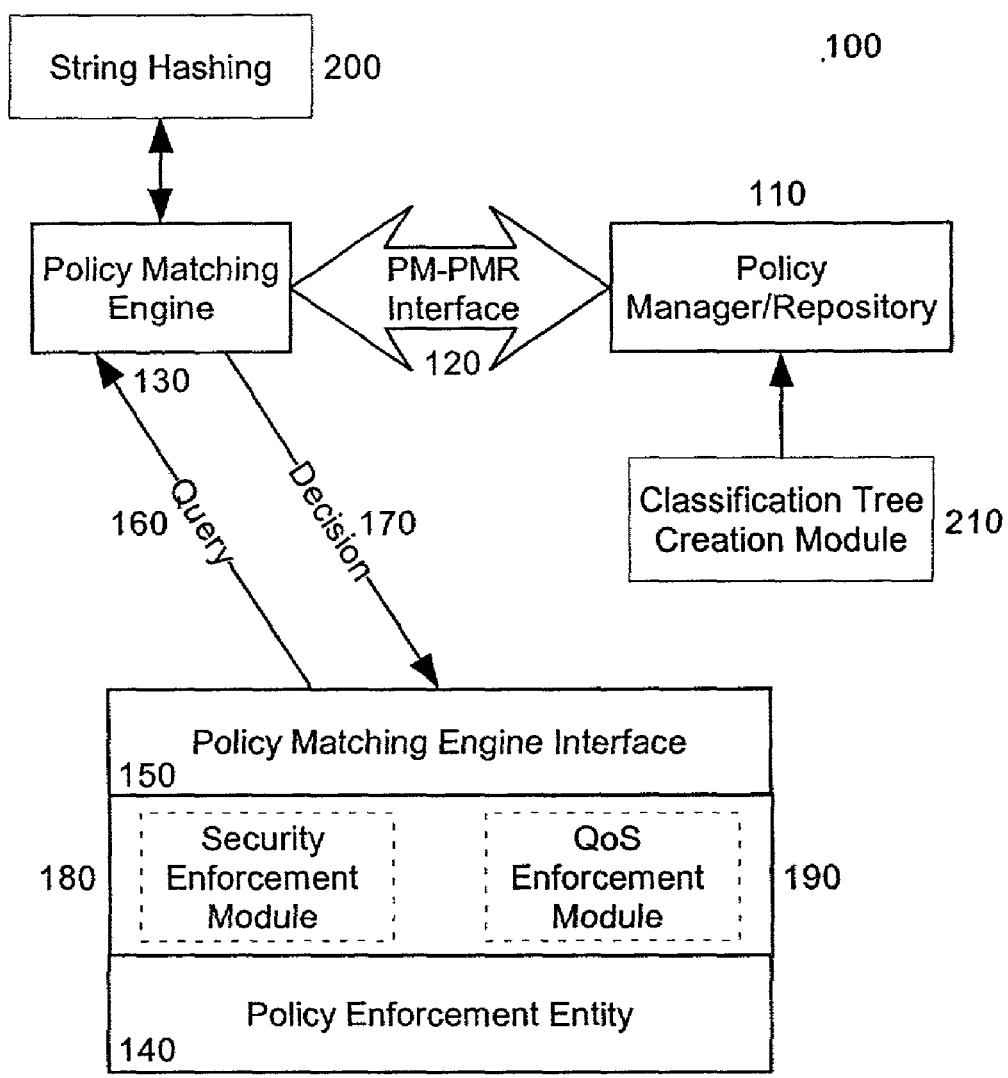
FIG. 1 is a schematic illustration of a network device configured to undertake discriminated policy enforcement though one or more specific services according to string based selector attributes in a hierarchical classification tree; and, FIG. 2 is a pictorial illustration of an exemplary hierarchical classification tree of the present invention.

FIG. 1 illustrates an exemplary architecture 100 in which policy based differentiation can be provided. FIG. 1 particularly illustrates the application of policy enforcement in an edge server. Still, the invention is not strictly limited to application within an edge server. Rather, in other architectures, the discriminated policy enforcement of the present invention can be incorporated in any network device configured to respond to network requests, including, for example, a Web server, or an application server.

The architecture 100 can include a policy matching engine 130 and a policy manager/repository 110 communicatively linked to one another through a policy matching engine/policy manager interface 120. A policy enforcement entity 140 can be provided in which network requests are received which can be evaluated by the policy matching engine 130. An exemplary policy enforcement entity 140 can include, for instance, an edge server, though the policy enforcement entity 140 also can take the form of other network devices, for instance a router, a Web server, an application server, etc.

The architecture 100 also can include one or more service specific modules, including, for example, a security enforcement module 180 and a QoS enforcement module 190. The service specific modules 180, 190 can apply policy characterizations to specific services. For instance, the security enforcement module 180 can apply policy characterizations to the enforcement of security rules in the policy enforcement entity 140. By comparison, the QoS enforcement module 190 can ensure varying levels of QoS in the policy enforcement entity 140 according to the policy characterizations received from the policy matching engine 130. Notably, the service specific modules 180, 190 can request and receive policy characterizations from the policy matching engine 130 through the policy matching engine interface 150.

In one aspect of the present invention, the policy enforcement entity 140 can forward queries 160 to the policy matching engine 130 through the policy matching engine interface 150 for all actions which can be applied to a received event, for example a network request. The decisions 170 returned by the policy matching engine 130 to the policy enforcement entity 140 can determine the actual treatment applied to a received network request. The decisions 170 returned by the policy matching engine 130 to the policy enforcement entity 140 also can influence the order in which the service specific modules 180, 190 process received requests.

The decisions 170 which can be returned by the policy matching engine 130 can depend upon a set of policy rules obtained from the policy manager/repository 110 over the interface 120. The decisions 170 also can depend upon the set of values for selector attributes in the network requests which can be required to undertake the fast policy classification of the present invention. The set of values for the selector attributes can be provided to the policy matching engine 130 within the queries 160 through the policy matching engine interface 150. Typical types of selector attributes for which values can be included in the queries 160 can include, for example, source and destination addresses, source and destination ports, the URI of the request and the server domain name.

In accordance with the inventive arrangements, a hierarchical classification tree creation module 210 can construct a hierarchical tree structure to represent a set of string based selector attributes, such as URIs or domain names including server domain names. In particular, the hierarchical classification tree creation module 210 can assign a range of integer numbers to fixed strings in the string based selector attributes. Once the hierarchical tree structure has been created with integer numbers having been assigned to all conditions represented by the set of string based selector attributes, events such as network requests which require policy based classification can traverse the leaves of the hierarchical classification tree seeking a matching policy rule.

Specifically, when an event requires a classification, such as an incoming Web request, the policy enforcement entity 140 can forward the selector attributes of the event to the policy matching engine 130 within a query 160. Upon receipt, the policy matching engine 130 can assign an integer number to the selector attributes of the event using the string hashing module 200. Once an integer number has been assigned to the selector attributes of the event, the policy matching engine 130 can seek a matching policy rule in the hierarchical classification tree structure using only integer operations rather than string comparison operations.

Figure 2:
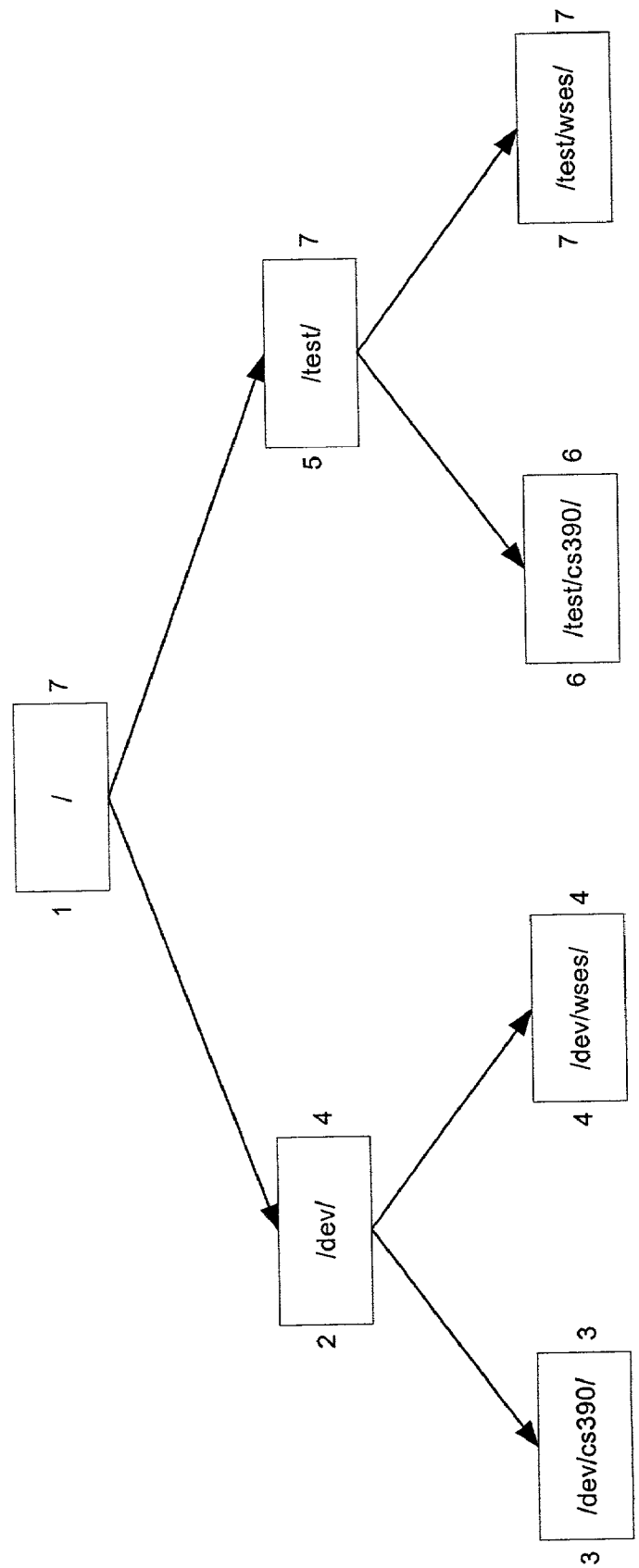

FIG. 2 is a pictorial illustration of an exemplary hierarchical classification tree of string based selector attributes which have been assigned integer ranges in accordance with the inventive arrangements. The exemplary hierarchical classification tree illustrated in FIG. 2 represents the range of policy conditions for seven policy rules tabulated in the following table:

| Policy Rules | URI | Assigned Ranges | User ID | QoS |
|---|---|---|---|---|
| PR1 | / | 1–7 | | Bronze |
| PR2 | /dev/ | 2–4 | | Silver |
| PR3 | /dev/cs390/ | 3–3 | | Silver |
| PR4 | /dev/wses/ | 4–4 | John | Gold |
| PR5 | /test/ | 5–7 | | Bronze |
| PR6 | /text/cs390/ | 6–6 | | Silver |
| PR7 | /text/wses/ | 7–7 | | Silver |

As will be apparent from the table of policy rules, six rules can be resolved based upon a string component of a URI. Notably, one rule can be resolved based upon the combination of a URI and a User ID.

The hierarchical tree structure can be constructed to represent a set of domain names recognizing that the hierarchical structure of a domain name can be characterized from right to left. Similarly, a hierarchical tree structure can be constructed to represent a set of URIs recognizing that the hierarchical structure of a URI can be characterized from left to right. For example, as shown in FIG. 2, the hierarchical tree structure associated with the set of URIs in the above-specified table can include "/" as the root node.

The root node can have two sub-tree structures. The first sub-tree structure can include "/dev/" and the second sub-tree structure can include "test". Finally, four leaves can form the base of the hierarchy: "/dev/cs390/", "/dev/wses/", "/test/cs390/", and "/test/wses/". Integer numbers can be assigned starting at the root selector attribute in the hierarchy and continuing depth-first, left-to-right. Integer ranges can be assigned to each node in the hierarchy according to the possible integer values of leaves below the node in the sub-tree of which the node forms a root node. Hence, while the "/" node has the range 1–7, each leaf node at the base of the hierarchy includes only its own integer value.

Once the integer ranges have been assigned to all string based selector attributes forming the policy conditions of the hierarchy, a classification search tree of policy conditions can be constructed. In one aspect of the present invention, the classification search tree can be constructed according to the classification search tree construction methodology disclosed in U.S. patent application Ser. No. 09/320,903, entitled "A Search Tree for Policy Based Packet Classification in Communication Networks" filed May 27, 1999 and assigned to International Business Machines Corporation of Armonk, N.Y., the contents of which are incorporated herein by reference.

When an event such as a network request requires classification, first the selector attribute of the event can be identified and an integer number can be assigned to the identified selector attribute. Though many methods can suffice, one suitable method can include a longest string hashing methodology such as that disclosed in U.S. patent application Ser. No. 09/645,651 entitled "Methods, Systems and Computer Program Products for Processing an Event Based on Policy Rules Using Hashing" filed on Aug. 24, 2000 and assigned to International Business Machines Corporation of Armonk, N.Y. Importantly, when incorporating the longest string hashing methodology of the '651 patent application, a hashing function need be applied only once per string based selector attribute.

For example, when a Web request is received, the Web request including a URI of "/dev/wses/design/doc1.html", a longest string hashing function can assign the integer "4" to the URI because the URI matches the policy condition "/dev/wses/" as specified in the classification policy. Notably, as shown in the exemplary hierarchical search tree of FIG. 2, if the Web request originates from the user "John", policy rule four will apply and the "Gold" QoS service level will be assigned to the requested document "doc1.html". In contrast, if the Web request originated by a user other than "John", policy rule two will apply since the integer range assigned to this policy condition ranges from 2 through 4. Importantly, as will be apparent to one skilled in the art, no additional string operation beyond the longest string hashing function will be required to locate a suitable policy rule in the hierarchical classification tree.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A policy based differentiator configured to be disposed in a policy enforcement entity having at least one policy oriented specific service comprising:

a policy repository configured to store hierarchical policy classification trees;

a hashing module configured to produce integer values for string based selector attributes;

a policy matching engine configured to locate policy rules in said hierarchical policy classification trees according to said integer values produced for said string based selector attributes; and, a policy matching engine interface through which policy queries and resulting policy decisions of said policy matching engine can be communicated between said policy matching engine and the policy enforcement entity.

2. The policy based differentiator of claim 1, further comprising:
   an integer range assignment module configured to assign integer ranges to corresponding ones of a set of selector attributes specifying a range of policy conditions used to identify policy rules;
   a policy classification tree creation module configured to create policy classification trees based upon said set of selector attributes and corresponding assigned integer ranges; and,
   a policy manager through which said policy classification trees can be modified.

3. The policy based differentiator of claim 1, wherein said hashing module comprises a longest string hashing function.

4. The policy based differentiator of claim 1, wherein the policy enforcement entity comprises a network entity selected from the group consisting of an edge server, an application server, a Web server, and a packet router.

5. A policy based differentiation method, the method comprising the steps of:
   extracting a string based selector attribute from a network request;
   assigning an integer value to a string based selector attribute;
   traversing a hierarchical policy based classification tree based upon said integer value; and
   locating in said policy based classification tree a matching policy rule;
   wherein said step of assigning an integer value to a string based selector attribute comprises the step of performing a longest string hashing function to said string based selector attribute.

6. A machine readable storage having stored thereon a computer program for performing policy based differentiation, said computer program comprising a routine set of instructions for causing the machine to perform the steps of:
   extracting a string based selector attribute from a network request;
   assigning an integer value to a string based selector attribute;
   traversing a hierarchical policy based classification tree based upon said integer value; and
   locating in said policy based classification tree a matching policy rule;
   wherein said step of assigning an integer value to a string based selector attribute comprises the step of performing a longest string hashing function to said string based selector attribute.

* * * * *